United States Patent
Böke

(10) Patent No.: US 11,007,390 B2
(45) Date of Patent: May 18, 2021

(54) METHOD FOR CHECKING THE IMPLEMENTATION OF MAINTENANCE WORKS IN FIRE EXTINGUISHING SYSTEMS

(71) Applicant: Minimax GmbH & Co. KG, Bad Oldesloe (DE)

(72) Inventor: Joachim Böke, Düsseldorf (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 0 days.

(21) Appl. No.: 16/629,947

(22) PCT Filed: Jul. 16, 2018

(86) PCT No.: PCT/EP2018/069259
§ 371 (c)(1),
(2) Date: Jan. 9, 2020

(87) PCT Pub. No.: WO2019/012154
PCT Pub. Date: Jan. 17, 2019

(65) Prior Publication Data
US 2020/0147431 A1   May 14, 2020

(30) Foreign Application Priority Data
Jul. 14, 2017  (DE) .......................... 10 2017 115 956

(51) Int. Cl.
*A62C 37/50*  (2006.01)
*G06K 7/10*  (2006.01)
(Continued)

(52) U.S. Cl.
CPC .......... *A62C 37/50* (2013.01); *G06K 7/10297* (2013.01); *G06K 19/0723* (2013.01); *G07C 3/00* (2013.01)

(58) Field of Classification Search
None
See application file for complete search history.

(56) References Cited

U.S. PATENT DOCUMENTS

2008/0122704 A1* 5/2008 King ................ G06K 19/07771
343/702
2016/0349205 A1* 12/2016 Stetter ................ G01N 27/4065
(Continued)

FOREIGN PATENT DOCUMENTS

CN  102254135 A  11/2011
CN  102667819 A  9/2012
(Continued)

OTHER PUBLICATIONS

English Machine Translation of DE102011012495, provided by WIPO (printed Sep. 15, 2020) (Year: 2012).*
(Continued)

*Primary Examiner* — Carlos Garcia
(74) *Attorney, Agent, or Firm* — Perkins Coie LLP

(57) ABSTRACT

The invention concerns a method of checking the implementation of maintenance works in a fire extinguishing installation, wherein there is provided an identification (3) which contains a radio identification means, for example a transponder chip or an NFC tag which is fixedly connected to a unit (2) to be maintained so that the identification (3) cannot be non-destructively removed from the unit to be maintained, wherein the identification (3) contains data of the unit (2) to be maintained and wherein the unit to be maintained is part of the fire extinguishing installation and has to be uninstalled for maintenance, wherein there is provided a reading unit (8) with which the identification of the unit (2) to be maintained and the data thereof are read and wherein the identification (3) is arranged concealed or shielded on the unit (2) to be maintained in such a way that
(Continued)

the data of the identification cannot be read with the reading unit (8) when the unit (2) to be maintained is in the non-uninstalled state.

8 Claims, 2 Drawing Sheets

(51) Int. Cl.
    *G06K 19/07*     (2006.01)
    *G07C 3/00*     (2006.01)

(56) References Cited

U.S. PATENT DOCUMENTS

2017/0039406 A1    2/2017    Delgado, Jr.
2018/0008851 A1*    1/2018    Abernathy ............. A62C 35/58

FOREIGN PATENT DOCUMENTS

| | | |
|---|---|---|
| CN | 103500473 A | 1/2014 |
| CN | 205132016 U | 4/2016 |
| CN | 205210924 U | 5/2016 |
| DE | 2011 012 495 A1 | 8/2012 |
| WO | WO 7/082340 A1 | 5/2017 |
| WO | WO 2017/082340 A1 | 5/2017 |

OTHER PUBLICATIONS

International Search Report (in German and English), International Application No. PCT/EP2018/069259 (published under WO 2019/012154), 8 pages (.

First Office Action (with English translation), Chinese Application No. 201880046633.2, 32 pages (dated Sep. 2, 2020).

\* cited by examiner

T1 - typical (empirical) maintenance time

METHOD FOR CHECKING THE IMPLEMENTATION OF MAINTENANCE WORKS IN FIRE EXTINGUISHING SYSTEMS

PRIORITY CLAIM AND INCORPORATION BY REFERENCE

This application is a National Stage of International Application No. PCT/EP2018/069259 filed Jul. 16, 2018 (now WO 2019/012154 A2), which claims priority to German Application No. 10 2017 115 956.8 filed Jul. 14, 2017, the contents of each of which applications is incorporated herein in its entirety.

TECHNICAL FIELD

The present invention concerns a method of checking the implementation of maintenance works in fire extinguishing installations.

BACKGROUND AND SUMMARY OF THE INVENTION

The basic starting point taken by the invention is the method known from DE 10 2011 012 495 A1 of checking the implementation of maintenance works in fire extinguishing installations.

That document discloses that a unit to be maintained is provided with an identification, for example an RFID transponder chip and the unit to be maintained has to be removed for checking the maintenance works in order then to take the part to be maintained or for example a valve flap of a dry valve alarm station to the reading unit which in accordance with a variant is disposed in a fire alarm centre and is thus arranged stationarily.

DE 10 2011 012 495 A1 however also discloses a mobile reading unit. When now that mobile reading unit is taken to the unit to be maintained while still in the installed state then the identification, that is to say the data stored on the RFID transponder chip, can be read with the reading unit, and thus the state of the art in that respect discloses a solution which is not secure in relation to maintenance trickery.

The object of the invention is now to improve the method and system known from DE 10 2011 012 495 A1 and more specifically in regard to an even greater level of security in relation to maintenance trickery on the one hand and also simplification in the implementation of maintenance checking on the other hand.

As is known from the above-mentioned state of the art maintenance of the unit to be maintained regularly presupposes removal of the unit to be maintained from the fire extinguishing installation and if the unit to be maintained is disposed in a housing, it also involves removal from the housing. If then the reading device is disposed stationarily, for example in the fire alarm centre, the part to be maintained with the identification has to be taken to the reading unit. That is possibly difficult to carry out when the part or unit to be maintained is relatively heavy or cumbersome or the distance from the position of removal of the unit to be maintained to the reading unit is relatively great. Thus for example in the case of large buildings it is not unusual for the fire extinguishing installation, for example a sprinkler system, to be distributed over the entire building and the distance to the fire alarm centre in the building can be 50 metres or more so that ultimately not a little time is wasted for the maintenance works for transporting the unit to be maintained with the identification to the reading unit disposed stationarily in the fire alarm centre.

The alternative disclosed in the above-mentioned state of the art, involving a mobile reading unit, does possibly overcome the transport problem, that is to say for bringing the identification and the reading unit together, but it entails the possibility that the reading unit is then held directly to the identification of the unit to be maintained so that finally no removal of the unit at all is required but there is the major problem that more specifically maintenance is only "simulated" (maintenance trickery; known as "fake service maintenance").

The main problem of many maintenance operations more specifically still persists, that removal of the unit to be maintained (including the openings, which possibly have to be made, in a building in which the unit to be maintained is fitted) requires a relatively great amount of time, for example 30 to 60 minutes.

The actual maintenance work which can consist of purely visual checking of the unit to be maintained or a cleaning operation or the replacement of worn components or simple mechanical or electrical functional testing of the unit to be maintained, can take place more quickly in that case, for example a time of less than 30 minutes, preferably 3 to 10 minutes.

In view of the fact that the maintenance works are also frequently outsourced by businesses, the maintenance service operatives therefore not uncommonly arrive at the idea of filling out suitable service documentation and in that situation only proceeding as though the maintenance had been effected ("fake service maintenance") because in that way alleged maintenance for an entire building can be quickly completed and billed.

The aim of the invention therefore is to avoid the previous disadvantages and to provide a simple method which nonetheless allows maximum checking for the implementation of maintenance works, in particular enforcing removal of the unit or part to be maintained.

The object of the invention is attained with a method according to claim 1. Advantageous developments are recited in the appendant claims.

The previously known system is developed in particular in that the identification is not only fixedly arranged on the unit to be maintained but is so arranged that reading of the data of the identification by taking the reading unit to the unit to be maintained in the operative state, that is to say in the state of not being uninstalled, is not possible in such a way that a successful reading operation is also made possible. If the unit to be maintained is in the operative state it is therefore not uninstalled from its environment in the fire fighting installation but is therefore in the installed state, then reading of the data of the identification by taking a mobile reading unit thereto is categorically excluded because for example the minimum reading distance between the reading unit on the one hand and the identification on the other hand cannot be achieved.

When reading an identification which contains a radio identification means, for example a radio identification means or an NFC tag or the like it is regularly necessary for a minimum spacing to be maintained between the radio identification means and the reading unit for that purpose.

In many systems that minimum spacing is for example about 1 to 2 cm (or less). That minimum spacing also applies only for an unshielded environment, for example for an air to air connection. That minimum spacing for successfully reading the data of the identification—also referred as the reading distance—is however not sufficient, even if the distance is less than the reading distance, when there is an electromagnetic shielding between the reading unit on the one hand and the radio identification means on the other hand, that is to say for example the transponder chip, the shielding being for example in the form of a partial layer, a metalisation layer and so forth which thus cannot be penetrated by electromagnetic rays or which provides that penetration by electromagnetic rays considerably increases the insertion loss.

The present application now discloses a number of embodiments as to the way in which it is possible to provide that, by virtue of a mobile reading device, the radio identification means at the unit to be maintained cannot be read off solely by moving the reading device thereto.

A first alternative provides that the identification, that is to say the radio identification means, is provided by an electromagnetic covering/shielding which for example can have a cover or a film which has electromagnetic shielding properties and is over the identification. As long as that is not removed a successful reading operation is not possible, not even when the distance of the reading unit head on the one hand and the radio identification means on the other hand is markedly less than the minimum spacing, but the electromagnetic shielding is between the reading unit head and the radio identification means.

A further possible option provides that the identification is to be fitted to the unit to be maintained in such a way that moving the reading head of the reading unit to the minimum reading distance is only possible when the unit to be maintained is also uninstalled.

A further alternative option provides that, when the unit to be maintained has an inside and an outside, the identification is arranged on the inside of the unit to be maintained. If for example the unit to be maintained is a part, for example a valve, valve flap, switch and so forth, which is arranged within a metal tube and the identification is then arranged on the unit to be maintained, for example on the valve, on the valve flap, on the switch and so forth, or on the inside of the metal tube, the reading head of the reading unit can be moved to the identification to the necessary reading distance only when the tube is uninstalled.

This also includes the possibility that the further alternative possibility, when for example the valve flaps of a fire extinguishing installation are to be maintained, the identification is disposed on the valve flaps themselves. As they are usually disposed in a pipe system moving the reading head of the reading unit to the identification is possible only when the unit to be maintained is uninstalled and when then the reading head for the identification is brought to the identification disposed on the valve flaps, this at the same time already enforces visual checking of the unit to be maintained because the service personnel cannot take the reading head of the reading unit blindly to the valve flaps.

If the unit to be maintained is disposed in a housing, a further alternative option is one where the housing is of a metallically or electromagnetically shielding configuration.

In that respect all known technologies, for example also the application of a metal layer to the housing, serve for electromagnetic shielding, in which case that metal layer can also be a metal film.

All the above-mentioned measures and alternatives are suitable for arranging the identification on the unit to be maintained in such a way that the data of the identification cannot be read by the reading unit in the operative state, that is to say in the installed state of the unit to be maintained in a fire extinguishing installation.

In a preferred embodiment the identification is fitted to the unit to be maintained (in the non-uninstalled state) in such a way that the reading unit can only be approached to the identification as far as a predetermined spacing, which spacing is then greater than the minimum reading distance. If then a mobile reading unit with reading head is brought to the identification then, as the predetermined spacing is greater than the minimum reading distance, it is not possible to carry out successful reading as long as the unit to be maintained has not been uninstalled.

The different variants of the invention are described with reference to and illustrated in the drawings. What is common to all solutions is that the unit to be maintained in the installed state has the identification which is fixedly arranged on the unit to be maintained (or on a housing which encloses the unit) and if a mobile unit is approached to the identification of the unit to be maintained, in the installed state the reading distance between the reading head of the reading unit on the one hand and the radio identification means on the other hand is greater than the minimum reading distance so that a reading operation is not possible as long as the unit to be maintained is still installed.

Accordingly the invention also enforces uninstallation of the unit to be maintained in order to be able to perform a successful reading operation.

A fire alarm centre is associated with the fire extinguishing installation, for example being disposed in the same building or building complex.

After reading of the identification and thus after reading of the data from the identification and transfer of those data into the reading device, for example at a memory there, those data can be transmitted to a suitable data store in the fire alarm centre. That can be done by a wireless or also a wired communication connection between the reading unit and a suitable receiving unit, connected to the data store, in the fire alarm centre.

To enhance the security in relation to fake service maintenance it can also be provided that, for a correct reading operation, the identification on the unit to be maintained must be read twice by the reading device, in which respect a correct reading operation presupposes that a given minimum time interval must be observed between the two reading operations.

That minimum time interval depends on the usual time duration of the maintenance service activity.

If for example 5 minutes are required for the actual maintenance service procedure, for example for cleaning the unit to be maintained, then the minimum time interval is 5 minutes, if the minimum maintenance duration is 10 minutes or another period of time, the minimum time interval between the two reading operations is correspondingly adapted.

That means specifically in maintenance operation that the service personnel, after uninstalling the unit to be maintained, takes the reading unit to the identification for the first time and reads the data, and then after the maintenance procedure and before re-installation, the reading operation is repeated.

If reading is effected only once then that is recorded in the evaluation unit arranged for example in the fire alarm centre, as "incorrect maintenance".

The variant presented here once again increases the pressure on the service personnel to also actually uninstall the unit to be maintained, for the twice reading, with the minimum time interval not being observed between the two reading operations, does not lead to a correct maintenance entry.

It will be appreciated that the period of time between the two reading operations also possibly includes the planned time usually required for uninstallation of the unit to be maintained from the fire extinguishing system, plus the maintenance time. Finally it can be provided that, when the time interval is less than the minimum time interval of the two reading operations, the reading unit is not ready for a further reading operation at another unit to be maintained, which carries a different identification, but that the reading of another part of another unit to be maintained presupposes that, after the first reading operation, the second reading operation is effected at the earliest after the predetermined time.

A number of examples of the invention are illustrated in the Figures.

MODE(S) FOR CARRYING OUT THE INVENTION

Figure 1A:
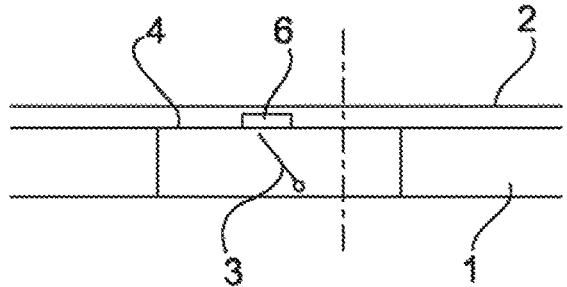
FIG. 1a shows a view from above of an arrangement of the unit to be maintained with identification.

FIG. 1a shows a view from above illustrating a pipe 1 which is parallel to a wall 2. The pipe 1 is part of a fire extinguishing installation, for example a feed pipe for an extinguishing agent, for example water. A valve 3 is disposed within the pipe 1 in a given portion.

The valve 3 is disposed in a pipe portion 4 which can be removed from the pipe 1. For example that pipe portion can be joined to the pipe 1 by suitable screw flanges. (Such screw connections are known and are not illustrated in the Figure).

Fitted to the pipe 4 (externally) on the side of the pipe portion 4 which faces towards the wall 2 (this can also be the room ceiling) is an identification 6, for example an RFID transponder chip, an NFC tag or a technically comparable solution.

Accordingly the identification 6 is directly opposite the wall 2 and thus faces away from the room 5. The room 5 is easily attainable on the opposite wall side of the pipe portion 4.

Figure 1B:
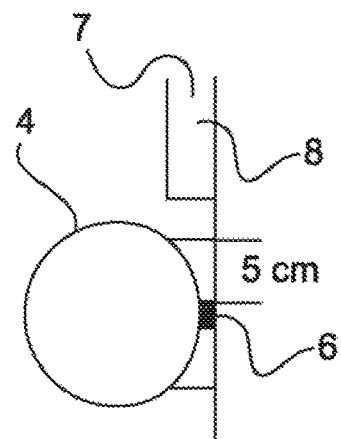
FIG. 1b shows a section through FIG. 1a, FIG. 2 shows an alternative configuration in which the identification is within the unit to be maintained.

It can be seen from FIG. 1b that the pipe is substantially of a circular cross-section.

Because the identification 6 lies directly at the wall it is now not possible with a reading unit 7 which has a reading head 8 to approach the reading head directly to the identification unit 6 because the space between the pipe portion 4 and the wall only allows an approach movement of the reading head to a given spacing, for example 5 cm.

If that reading spacing of for example 5 cm is greater than the minimum reading distance of for example 2 cm it is not possible to carry out a successful reading operation.

For making the reading the reading unit 7 usually emits a given excitation signal (for example a burst signal) with a given energy content. That signal is fed by way of the usual antennas of a radio identification means (RFID transponder) which then generates a corresponding response signal and sends it back by way of its antennas to the reading unit 7.

The radio identification means itself therefore does not contain its own energy storage means but the signal strength of the returned signal of the radio identification means crucially depends on the signal strength of the signal that the radio identification means receives.

That however is dependent on the reading distance.

The greater the distance the corresponding less energy is contained in the signal, that the radio identification means receives from the reading unit, and the corresponding less then is the energy of the signal which the radio identification means can emit.

Accordingly a successful reading operation does not occur when the reading distance between the reading unit 7 and the identification is greater than the minimum reading distance.

Figure 2:

FIG. 2 shows a similar situation to FIG. 1, but there the identification 6 is fitted fixedly on the inside of the pipe portion 4. If the pipe for example is a metal pipe, which is regularly the case with pipes of fire extinguishing installations then by virtue of the metal nature of the pipe and its closed nature with the entire pipe 1 this involves such a great electromagnetic shielding effect (Faraday cage) that a successful reading operation is not possible even when the reading head 8 of the reading unit 7 is held against the outside of the pipe, in particular even at the location of the outside which is at the location where the radio identification means is fitted internally in the pipe portion 4.

If the pipe is not a metal pipe but for example a plastic pipe then, in order to involve electromagnetic shielding, it can be provided with metal particles or can also be seen in the inwardly disposed metal cladding, for example with an electrically conductive coating, film or the like.

Figure 3A:
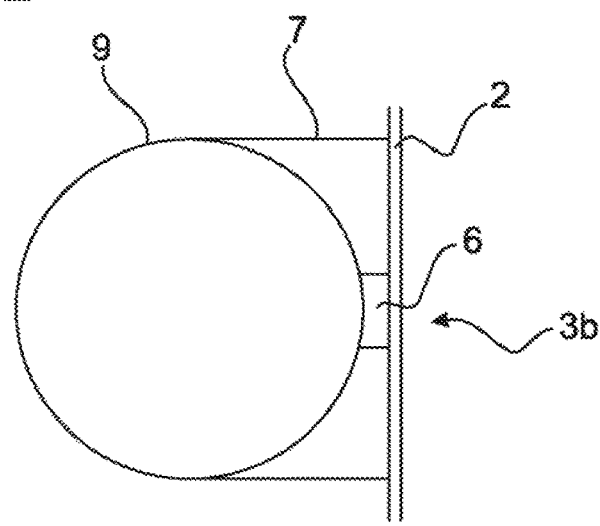
FIG. 3a shows an alternative configuration for FIG. 1.
Figure 3B:
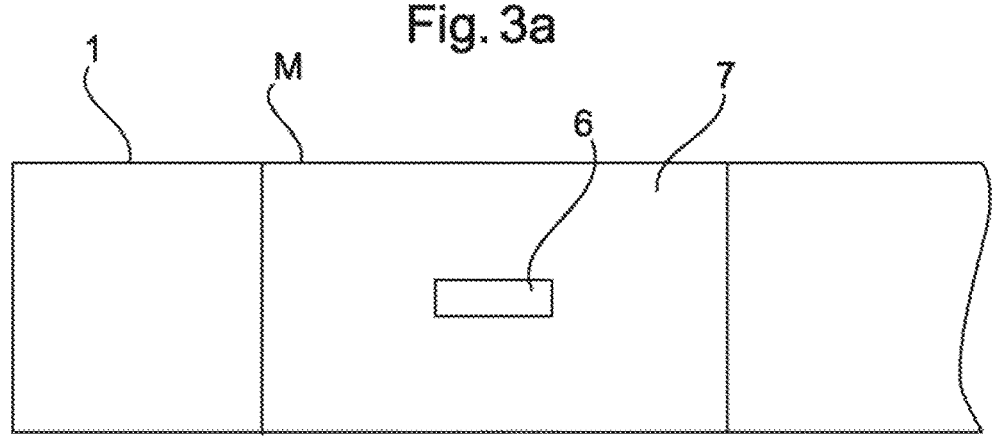
FIG. 3b shows an alternative configuration for FIG. 1.

FIGS. 3a, b show an alternative configuration to FIG. 1.

In this case provided on the part of the pipe portion 4 that is towards the wall 2 is a cover 9 which on the one hand accommodates the identification 6 but on the other hand prevents a reading unit from being able to be approached to the identification 6 as long as the pipe portion 4 is not uninstalled.

The cover 9 in that arrangement can be for example a plastic part or may also comprise metal and the cover is preferably fitted, for example glued, screwed or the like, to the outside of the pipe portion 4.

Figure 4:
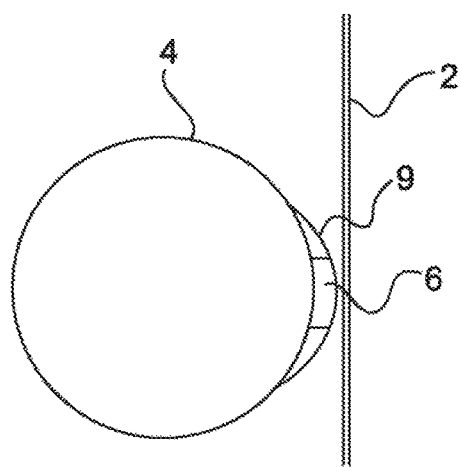
FIG. 4 shows a further alternative configuration with a cover 9 of electromagnetically shielding material over the identification.

FIG. 4 shows a further alternative.

In this case once again the identification 6 is arranged between the wall 2 and the pipe portion 4. At the same time there is a cover 9 over the identification 6. That cover 9 is preferably of such a configuration that it provides electromagnetic shielding. That is possible for example by the cover itself comprising metal or a metal film or the like.

If the pipe portion 4 is uninstalled a successful reading operation can therefore be carried out only when the cover 9 is removed.

Figure 5:
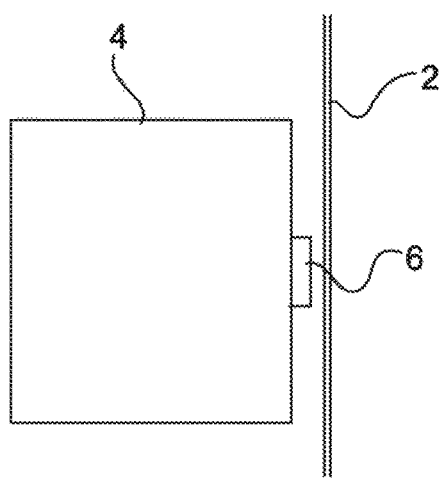
FIG. 5 shows a further alternative configuration.

FIG. 5 shows a further alternative embodiment.

In this case the pipe cross-section of the pipe portion 4 is not round but substantially rectangular or square.

Once again the identification 6 is arranged at the side of the pipe portion 4 that is towards the wall 2. Once again a reading unit 7 with its reading head 8 cannot be moved sufficiently closely to the identification 6 to carry out a successful reading operation as long as the pipe portion 4 is not uninstalled.

In a configuration of the pipe which can be readily reached from all sides and which is therefore not restricted at any side by a wall or ceiling portion it is appropriate for the identification 6 to be fitted within the pipe portion so that the pipe portion has to be uninstalled for a successful reading operation.

Figure 6:
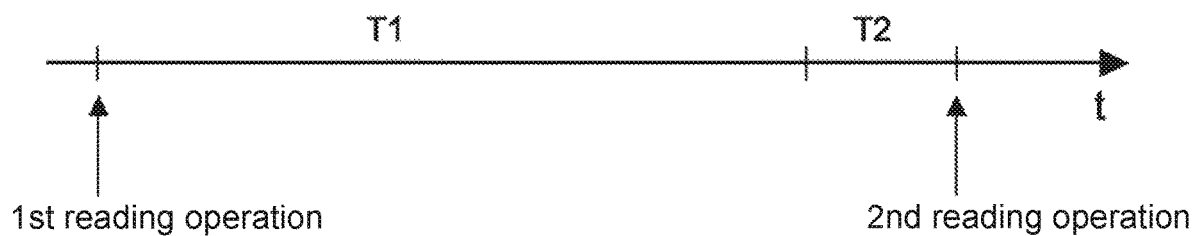
FIG. 6 shows a timeline T.

FIG. 6 shows a timeline T.

Within that timeline there are two time portions, namely T1 and T2.

If the pipe portion 4 or the unit to be maintained in accordance with one of the illustrated examples is uninstalled then a first reading operation can be effected after uninstalling, whereby T1 is started. The second reading operation can be effected after conclusion of the maintenance operation, that is to say after expiry of the time portion T1. The second reading operation can be carried out during the second time portion T2 which adjoins the time portion T1 and which is after termination of the maintenance procedure.

The time portion T1 can be a maintenance time which is individually adapted for the maintenance personnel and can represent a time duration which on the one hand corresponds to a typical maintenance time which is known empirically and which on the other hand is also matched to individual performance of the corresponding maintenance personnel. If a service operative, by virtue of his great experience and competence, is quicker than another service operative, then that more experienced service operative will entail a maintenance time T1 shorter than that of an inexperienced service operative.

As the specific maintenance is known, for example visual checking, cleaning of a part of the unit to be maintained, possibly small repairs, and so forth, the reading unit 7 has to be taken to the identification 6 for a successful reading operation twice, in which case the minimum time interval for a successful reading operation is defined, more specifically by the intended minimum time for the maintenance procedure.

If that minimum time, that is to say the time interval between the two individual reading operations, is not observed, it is not possible to perform overall a successful reading process, with the consequence that there cannot be a successful maintenance acknowledgement.

The maintenance time T1 is a typical maintenance time, that is to say a time duration which is established and based on experience, that is required for the specific maintenance.

If the unit to be maintained has to be maintained only over a period of time, for example every 2 years, and for example only a given visual check has to be effected once, then a time duration of T1 is possibly required for that purpose.

If on another occasion not just a visual check but also technical functional testing or even enforced uninstallation of a component has to be effected, that usually takes longer and a different time duration of T1* can then be pencilled in for that, in which case T1*>T1.

The consequence of this is that, depending on what maintenance has to be carried out, different time durations T1, T1* and so forth are also programmed so that a successful reading operation presupposes that the different time durations T1, T1* and so forth involved are also observed.

Thus with the invention the method not only compels uninstallation also actually to be effected, but requires a predetermined time duration also to be observed for a given maintenance step.

The identification 6 can also include a commissioning date of the unit to be maintained, for example the valve flap, and can thus also make it possible to predetermine the type of maintenance. It is for example conceivable that only an ordinary visual check has to be effected annually, but that a mechanical functional check also has to be effected every three years. As a mechanical functional check takes longer than just a visual check the corresponding time duration T1 then also has to be longer than with a normal "visual check".

This overall also enhances the quality of maintenance and avoids an unwanted "piecework stress" which readily afflicts maintenance personnel when they are counted in terms of the number of maintenance operations they have performed.

The solution described with reference to and illustrated in one of the Figures can also be verified in connection with a reading device fixedly installed in the fire alarm centre.

In that case the unit to be maintained has to be uninstalled from the housing, then transported to the reading unit of the fire alarm centre in order there to trigger a first reading operation. The reading operation triggers a timer and it is only when a predetermined time duration T1 has expired, as already described, that a successful second reading operation can take place.

Between the two reading operations the maintenance personnel has sufficient time to carry out the desired maintenance. If the maintenance personnel needs more than the intended minimum time, then that is harmless in terms of the successful second reading operation and thus the overall reading procedure.

If the reading unit is a mobile reading unit the timer for measuring T1, T1*, T2 and so forth is itself disposed in the reading unit or a device connected thereto. As the second reading operation is required for conclusion of the maintenance, more specifically at a predetermined time interval after the first reading operation, the successful reading operation is suitably acknowledged (for example also optically and/or acoustically) and re-fitment of the part to be maintained can be effected.

When the mobile reading unit has a wireless or radio link to the fire alarm centre and a suitable receiver there, the mobile reading unit can transmit the corresponding maintenance data (possibly including the times for the first and second reading operations or the time between two reading operations), besides the data of the identification, for example component data about the unit to be maintained, day of maintenance, possibly identification of the maintenance personnel, if same has a personal reading unit, and so forth.

If the reading unit is to remain in the fire alarm centre however it is also possible for transmission of the data from the reading unit to be effected when the reading unit is brought into a suitable, for example wired, connection with the fire alarm centre.

With the invention of the present application the system preferably intentionally uses a radio identification means which is part of the identification, in which a successful reading operation presupposes a minimum reading distance which is as short as possible, for example one or at a maximum 2 cm. As a result this structurally enforces uninstallation of the unit to be maintained, more specifically even when the reading head of the reading unit 7 is so narrow that it can also be in part introduced in the region between the pipe portion 4 and the wall 2.

Insofar as the unit to be maintained is described in the present application this can be taken to mean entirely different parts, for example a pipe portion, a valve station, a valve flap, or nozzles, or flow monitors, or pumps, or any housing portions, or switches, and so forth.

Initial tests of the invention have shown in practical application that fake service maintenance can be considerably reduced by implementation of the invention and thus at the same time the quality of maintenance is considerably improved.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

LIST OF UTILIZED REFERENCE NUMBERS 1 pipe
2 wall
3 valve
4 pipe portion
5 room
6 identification
7 reading unit
8 reading head
9 covering

The invention claimed is:

1. A method of checking the implementation of maintenance works in a fire extinguishing installation, the method comprising:
providing an identification which contains a radio identification means which is fixedly connected to a unit to be maintained so that the identification cannot be non-destructively removed from the unit to be maintained, wherein the identification contains data of the unit to be maintained and wherein the unit to be maintained is part of the fire extinguishing installation and has to be uninstalled for maintenance,
providing a mobile reading unit with which the identification of the unit to be maintained and the data thereof are read, and
arranging the identification concealed or shielded on the unit to be maintained in such a way that the data of the identification cannot be read with the mobile reading unit when the unit to be maintained is in the non-uninstalled state.

2. A method according to claim 1, wherein the identification is mounted in the installed state of the unit to be maintained of the fire extinguishing system in such a way that the mobile reading unit can only be approached to the identification as far as a predetermined spacing, wherein the predetermined spacing is greater than the minimum reading distance necessary for a successful reading operation of the data of the identification by the mobile reading unit.

3. A method according to claim 2, wherein the predetermined spacing is more than 2 cm, wherein the unit to be maintained is arranged in the operative state in a housing and thus the spacing between the identification and the mobile reading unit is at a minimum 2 cm or more.

4. A method according to claim 3, wherein the housing has an electromagnetic shielding and wherein the housing is metallic and/or has a metalising layer.

5. A method according to claim 1, wherein the unit to be maintained has an outside and an inside and the identification is provided at the inside of the unit to be maintained.

6. A method according to claim 1, wherein the identification is provided with an electromagnetic shielding covering which is to be removed for reading the identification by the mobile reading unit.

7. A method of checking the implementation of maintenance works in a fire extinguishing installation, the method comprising:
providing an identification which contains a radio identification means including at least one of a transponder chip or an NFC tag which is fixedly connected to a unit to be maintained so that the identification cannot be non-destructively removed from the unit to be maintained, wherein the identification contains data of the unit to be maintained and wherein the unit to be maintained is part of the fire extinguishing installation and has to be uninstalled for maintenance,
providing a mobile reading unit with which the identification of the unit to be maintained and the data thereof are read, and
arranging the identification concealed or shielded on the unit to be maintained in such a way that the data of the identification cannot be read with the mobile reading unit in the non-uninstalled state,
wherein at least two reading operations for reading the data and for identification by the mobile reading unit are necessary for maintenance of the unit to be maintained, wherein after a first reading operation of the at least two reading operations it is necessary to wait for a first predetermined time duration (T1) before a second reading operation of the at least two reading operations can be successfully carried out wherein the first time duration (T1) is stored in the mobile reading unit.

8. A fire extinguishing installation comprising:
at least one unit to be maintained, wherein the unit to be maintained is fixedly connected to an identification which contains a radio identification means including at least one of a transponder chip or an NFC tag so that the identification cannot be non-destructively removed from the unit to be maintained, wherein the identification contains data of the unit to be maintained and wherein the unit to be maintained is part of the fire extinguishing installation and has to be uninstalled for maintenance, and
a mobile reading unit with which the data of the identification of the unit to be maintained can be read, wherein the identification is arranged concealed or shielded on the unit to be maintained in such a way that the data of the identification cannot be read with the mobile reading unit when the unit to be maintained is in the non-uninstalled state.

* * * * *